United States Patent [19]
Zonca et al.

[11] Patent Number: 5,239,563
[45] Date of Patent: Aug. 24, 1993

[54] PLASMA MOMENTUM METER FOR MOMENTUM FLUX MEASUREMENTS

[75] Inventors: Fulvio Zonca, Rome, Italy; Samuel A. Cohen, Hopewell, N.J.; Timothy Bennett, Princeton, N.J.; John R. Timberlake, Allentown, N.J.

[73] Assignee: The United States of America as represented by the United States Department of Energy, Washington, D.C.

[21] Appl. No.: 726,076

[22] Filed: Jul. 5, 1991

[51] Int. Cl.⁵ ............................................. G21B 1/02
[52] U.S. Cl. ................................. 376/143; 376/153; 376/154; 376/100; 73/579; 73/581
[58] Field of Search ............. 376/143, 153, 154, 100; 73/579, 581; 33/502; 177/210 C, 211

[56] References Cited

U.S. PATENT DOCUMENTS

| | | | |
|---|---|---|---|
| 2,598,812 | 6/1952 | Marco et al. | 265/27 |
| 2,614,416 | 10/1952 | Hollman | 73/133 |
| 3,590,932 | 7/1971 | Dybwad et al. | 177/210 |
| 3,753,472 | 8/1973 | Dybwad et al. | 177/210 |
| 4,616,511 | 10/1986 | Gindy et al. | 73/862.04 |
| 4,646,859 | 3/1987 | Stuart | 177/187 |
| 4,700,656 | 10/1987 | Cone et al. | 177/245 |
| 4,732,160 | 3/1988 | Ask et al. | 128/760 |
| 4,838,367 | 6/1989 | Tsai | 177/25.15 |
| 4,899,600 | 2/1990 | Lee | 73/862.64 |

OTHER PUBLICATIONS

Cohen, S. A. et al., *An Instrument for Measuring the Momentum Flux from Atomic and Charged Particle Jets,* Jul., 1990, pp. 2–17.

Paul et al., "Measurement of Density and Mean Molecular Velocity in an Atomic Beam" (translated from the German), Zeitschrift fuer Physik 124 (1948), No. 7–12, 691–699.

*Primary Examiner*—Donald P. Walsh
*Assistant Examiner*—Chrisman D. Carroll
*Attorney, Agent, or Firm*—Bradley W. Smith; John M. Albrecht; William R. Moser

[57] ABSTRACT

Invention comprises an instrument in which momentum flux onto a biasable target plate is transferred via a suspended quartz tube onto a sensitive force transducer—a capacitance-type pressure gauge. The transducer is protected from thermal damage, arcing and sputtering, and materials used in the target and pendulum are electrically insulating, rigid even at elevated temperatures, and have low thermal conductivity. The instrument enables measurement of small forces ($10^{-5}$ to $10^3$ N) accompanied by high heat fluxes which are transmitted by energetic particles with 10's of eV of kinetic energy in a intense magnetic field and pulsed plasma environment.

19 Claims, 4 Drawing Sheets

PLASMA MOMENTUM METER FOR MOMENTUM FLUX MEASUREMENTS

CONTRACTUAL ORIGIN OF THE INVENTION

The U.S. Government has rights in this invention pursuant to Contract No. DE-AC02-76CH03073 between the U.S. Department of Energy and Princeton University.

BACKGROUND OF THE INVENTION

This invention relates to an instrument for quantifying the interaction between atomic, ionic, and/or plasma jets with solid or liquid materials surfaces. In particular, this invention relates to an apparatus for the measurement of particle, momentum, and energy fluxes of a plasma stream where forces onto surfaces defining the plasma boundary are transmitted by ionic and neutral particles with 10's of eV's of kinetic energy, are accompanied by high heat fluxes, and are pulsed.

Work toward the goal of fusion energy production is progressing in a number of laboratories throughout the world. In the area of magnetic confinement fusion, the major effort is focused on the "tokamak" device, which consists of a toroidal vessel that contains a high temperature plasma, surrounded by magnetic field coils that confine and position the plasma. Design and operation of these devices requires quantitative study of the interaction between an intense plasma stream and surfaces of different materials immersed in dense plasmas.

In the prior art, momentum and energy flows and pressures are calculated using the kinetic theory of gases from measurements of density with ionization, thermocouple, or manometer gauges. The prior art methods are unsuitable, however, for surfaces immersed dense plasmas ($n > 10^{12}$ cm$^{-3}$); little experimental data are available on the effects of ionic impacts, in the energy range $<100$ eV, onto surfaces; and the theory of plasmas is sufficiently complex (due, for example, to varying collisionality) that single-point measurements of plasma temperature and density in the plasma interior, as by probes or Thomson scattering, do not readily yield an accurate prediction for the particle, momentum, or energy fluxes at the boundaries of the plasma.

It is therefore a primary object of this invention to provide a diagnostic instrument to measure the absolute pressure (momentum flux) from an intense plasma stream where forces onto surfaces defining the plasma boundary are transmitted by ionic and neutral particles with 10's of eV's of kinetic energy and are accompanied by high heat fluxes.

In the accomplishment of the foregoing object, it is another important object of this invention to provide an instrument for measuring momentum flux of a plasma stream in an intense magnetic field and pulsed plasma environment.

It is another important object of this invention to provide an instrument for measuring momentum flux which may be calibrated in situ, without the need to vent to air.

It is a further object of this invention to present an instrument for measuring pulsed momentum flux which gives a response time of approximately 1 ms.

Additional objects, advantages and novel features of the invention will become apparent to those skilled in the art upon examination of the following and by practice of the invention.

SUMMARY OF THE INVENTION

To achieve the foregoing and other objects, this invention comprises an instrument in which momentum flux onto a biasable target plate is transferred via a suspended quartz tube onto a sensitive force transducer—a capacitance-type pressure gauge. The transducer is protected from thermal damage, arcing and sputtering, and materials used in the target and pendulum are electrically insulating, rigid even at elevated temperatures, and have low thermal conductivity. The instrument enables measurement of small forces ($10^{-5}$ to $10^3$ N) accompanied by high heat fluxes which are transmitted by energetic particles with 10's of eV of kinetic energy in an intense magnetic field and pulsed plasma environment.

BRIEF DESCRIPTION OF THE DRAWINGS

The present invention is illustrated in the accompanying drawings where.

DETAILED DESCRIPTION OF THE INVENTION

Figure 1:
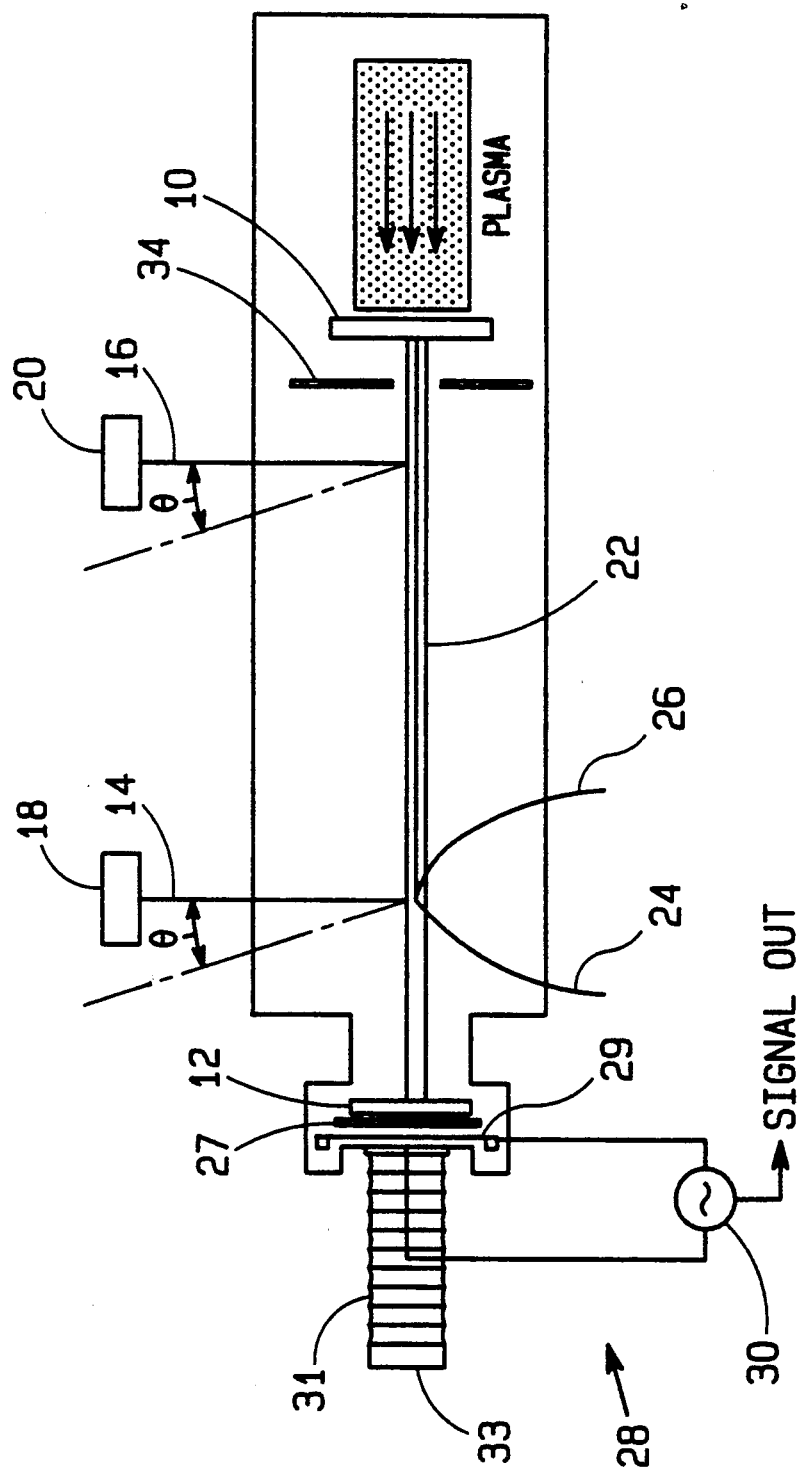
FIG. 1 is a schematic drawing of the present invention.

As depicted in the schematic drawing of FIG. 1, momentum flux of the plasma stream on target 10 is transferred via quartz rod 22 and carbon plug 12 to transducer 28, comprised of diaphragm 29 and capacitor 30. Quartz rod 22 is suspended by pairs of wires 14 and 16 from adjustable supports 18 and 20, respectively. Metal shield 34 protects pairs of wires 14 and 16 from plasma bombardment. Leads 24 and 26 allow for biasing and monitoring the temperature of target 10.

Carbon target 10 is manufactured from ATJ graphite. It is shaped as two coaxial disks, roughly 1 and 3.5 cm in diameter, each 0.5 cm thick. The smaller disk has a coaxial hole 5 mm in diameter that allows it to be securely placed onto quartz rod 22. The diameter of the larger disk was chosen to exceed the diameter of the plasma jet by about 1 cm. Those skilled in the art will recognize that targets of different materials, shapes, and orientations may be substituted for target 10.

Quartz rod 22 has an i.d. of 3 mm, an o.d. of 5 mm, and a length of 68.5 cm. Quartz is used because of its electrical insulating properties, light weight, rigidity even at elevated temperatures, and low thermal conductivity. Calculations show that, even after 1 hour of plasma bombardment of target 10 at 10 W/cm$^2$, the temperature rise of quartz rod 22 at diaphragm 29 is less than 30 degrees centigrade and that the increase in length of rod 22 will not alter calibration.

Hollow quartz rod 22 provides a channel to run wires to target 10. This allows for electrical biasing of target 10 or monitoring the temperature of target 10 with a thermocouple (not shown) through leads 24 and 26. In applications where a magnetic field is present, it is advisable to orient leads 24 and 26 parallel to the field to avoid magnetic forces.

Quartz rod 22 has a carbon plug 12 on the end opposite target 10 that presses against diaphragm 29. This distributes force evenly over diaphragm 29, preventing plastic distortion. Between carbon plug 12 and diaphragm 29 is cushion 27 which reduces bouncing of quartz rod 22 off of diaphragm 29 when an impulsive load is applied.

Transducer 28 is comprised of diaphragm 29 and capacitor 30. In the preferred embodiment, transducer 28 is a Baratron ®, commonly used as a pressure sensor in the range $10^{-6}$ to $10^4$ mTorr for room-temperature gases. The Baratron ® is a capacitance manometer, i.e. a pressure differential causes elastic deflection of a thin, tensioned, circular, metallic diaphragm 29 which is one electrode of a capacitor 30. From the specifications of the head used, forces in the range of $10^{-5}$–$10^{-1}$ N can be measured with an accuracy of 1%, once the conversion from pressure to force has been obtained. Use of Baratron ® heads with higher pressure capabilities, to $10^4$ Torr, allows extension of the measurable force range to $\sim 10^3$ N.

Other pressure transducers, such as piezoelectric or strain gauges or torsion pendula, may be used. However, they are less suitable for application in an intense magnetic field an pulsed plasma environment.

Quartz rod 22 is maintained in a horizontal position by means of two pairs of $\sim$3-mil chromel wires 14 and 16 that suspend quartz rod 22 at points about 10 and 30 cm from target 10 and carbon plug 12, respectively. The exact location of each support pair is chosen to avoid integral and fractional length resonances in tube bending. At each suspension point each wire within pairs of wires 14 and 16 is at 45° with respect to the vertical. Each pair of wires 14 and 16 is coplanar and perpendicular to the axis of rod 22. The length of each wire, controlled by adjustable micrometer-type mounts 18 and 20, is about 10 cm. This suspension allows only longitudinal, axial displacement of quartz rod 22. A thin metal shield 34 protects pairs of wires 14 and 16 from plasma bombardment.

Quartz rod 22 and pairs of wires 14 and 16 are mounted in a stainless-steel vacuum housing 32 with port crosses for mounts 18 and 20. Diaphragm 29 is attached to one end of housing 32 by use of stainless-steel welded bellows 31. The length of bellows 31 is set with micrometer mount 33. This is used to control contact between carbon plug 12, damping cushion 27, and diaphragm 29 and is an essential element in the calibration routine.

The pressure data output by transducer 28 ($\chi$), the force $F_\chi$ exerted on target 10 by the plasma column, and the plasma momentum flux $\Phi$, are related by $$\Phi = F_\chi/S_{plasma} = \chi S_{eff}/S_{plasma} \tag{1}$$

where $S_{eff}$ is the effective interaction area of diaphragm 29 and $S_{plasma}$ is the plasma cross section. For a circular tensioned diaphragm, deformed by a uniformly applied force, $S_{eff}$ can be easily calculated by analytic methods. But, because the exact shape of deformation caused by the contact of carbon plug 12 with diaphragm 29 is not readily measured, the apparatus needs to be calibrated to experimentally determine $S_{eff}$.

Calibration may be accomplished by several different methods, many of which rely on gravity. Referring to FIG. 1, in the preferred embodiment of the present invention calibration is accomplished by moving diaphragm 29 axially relative to quartz rod 22 using bellows 31. When diaphragm 29 is moved towards quartz rod 22, the angle $\theta$ of pairs of wires 14 and 16 with respect to vertical increases. The resulting increment in gravitational force $\Delta F_g$, is related to displacement, $\Delta x$, of quartz rod 22 by $$\Delta F_g = M\omega_0^2 \Delta x = Mg \sin \theta \tag{2}$$

where g is the gravitational acceleration, M is the total mass of quartz rod 22 and attachment, e.g., target 10, and pairs of wires 14 and 16, and $\omega_0$ is the free oscillation frequency of the pendulum. Mass is measured using a precision microbalance; natural frequency is measured using a pickup coil near target 10 and a small ($<$0.05 g) magnet, temporarily attached to target 10. The total mass of the pendulum and the pendulum frequency were found to be 34.225±0.001 g and 16.16±0.02 Hz, respectively. The force increment is related to transducer 28 output by $$\Delta F_g = \Delta X S_{eff}. \tag{3}$$

Defining the output of transducer 28 as $$R = \Delta X/\Delta x \tag{4}$$

from a gravitational loading, giving $$S_{eff} = M\omega_0^2/R. \tag{5}$$

Figure 2:
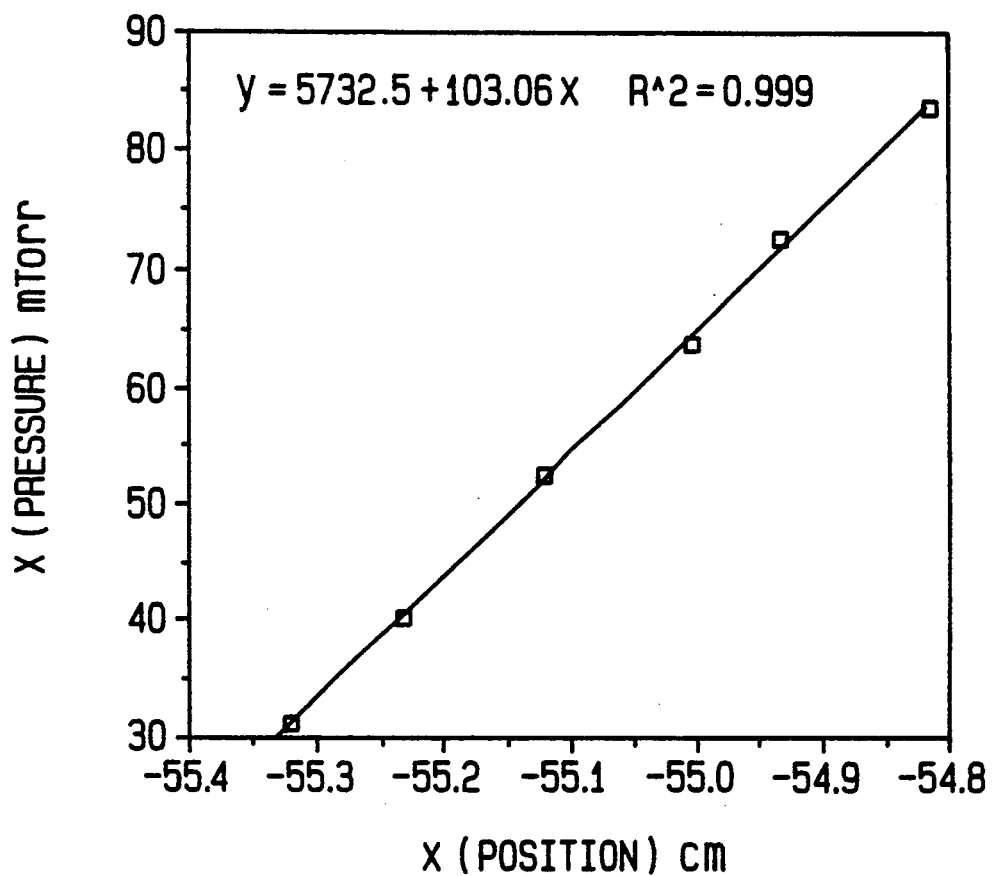
FIG. 2 is a graphic plot of calibration data, showing pressure data versus displacement of the transducer diaphragm.

From a least squares fit of the pressure data versus diaphragm displacement shown in FIG. 2, we get R=103.06 mTorr/mm (with $\sigma_R$=0.47 mTorr/mm) or R=1.374×$10^3$ dyne/cm$^3$ (with $\sigma_R$=6 dyne/cm$^3$), from which $S_{eff}$=6.51±0.04 cm$^2$. (The geometrical area of diaphragm 29 is about 20 cm$^2$.) This calibration yields the conversion of gauge pressure to applied force (both in practical units), $$F_\chi(grams) = 8.86 \pm 0.05 \times 10^{-3} \chi(mTorr). \tag{6}$$

To obtain the momentum flux, the cross-sectional area of the plasma must be known [Eq. (1)]. For a plasma which is uniform, measurements of momentum flux are averages over the plasma cross section.

Transducer pressure data in FIG. 2 start at $\sim$30 mTorr. This value is a fixed offset applied to transducer 28 of the preferred embodiment by shortening the length of bellows 31 by use of micrometer mount 33. It is useful to preload cushion 27 between carbon plug 12 and diaphragm 29 to reduce compression during subsequent loads because motion of quartz rod 22 causes a reduction in force applied to transducer 28 by an amount Mg sin $\theta$. Smaller preloads are to be used for detecting smaller forces.

This method of calibration allows in situ recalibrations, without the need to vent housing 32 to air. Also, calibrations done with the apparatus exposed to air require a pumpable chamber on the back face of diaphragm 29. Without this pumpable chamber, exposure to atmospheric pressure causes the diaphragm to seat itself on the counter electrode.

In the preferred embodiment the variable capacitor 30 comprising transducer 28 is part of an RF capacitance bridge that operates at 10 kHz. The high accuracy of transducer 28 requires an electronic averaging time of typically 10 cycles. This gives an intrinsic response time of 1 ms. (The response of the Baratron ® to gas pressure changes can be longer due to vacuum conductances.)

The response time of the present invention is longer, however, due to the natural frequency and mass of quartz rod 22, the natural frequency of diaphragm 29, and the small, but finite, compression of cushion 27. The compression of cushion 27 is approximately linear with applied force at low forces, but rapidly saturates at high forces. From the nonlinearity of the data in FIG. 2, at $\chi \sim -55.35$ mm, it appears that compression saturates at a $F_s < 0.001$ g, corresponding to a displacement of $(F_s/M\omega_0) \sim 0.001$ cm. This will add less than $\frac{1}{4}$ an oscillation period to the response time of the apparatus, corresponding to $\sim 75$ ms for the undamped pendulum and $< 30$ ms for the damped pendulum.

Figure 3A:
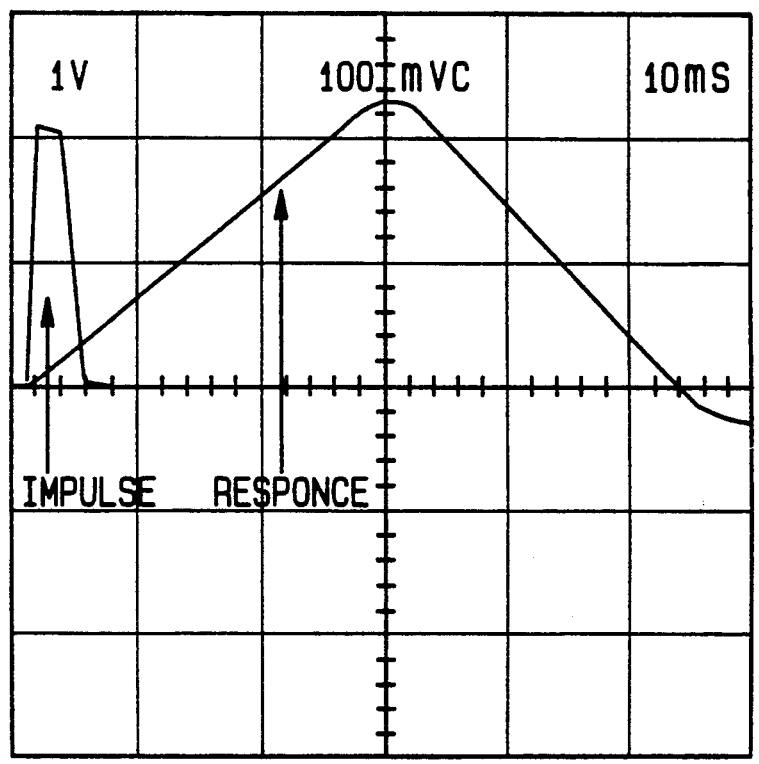
FIG. 3a is an idealized plot of response time of the present invention for the impulse of a helium plasma onto a negatively biased target.

FIG. 3a is an idealized plot of response time of the present invention for the impulse of an He gas plasma onto a negatively biased target. The response time of the apparatus was measured using plasma pulses of varying duration from a linear plasma device. Short duration plasma pulses, $<20$ ms, provide a current to target 10. The force is essentially impulsive, followed by a decay time of $\sim 10$ ms. The apparatus output rises to a peak about 25 ms after the impulse and then decays in a similar time.

Figure 3B:
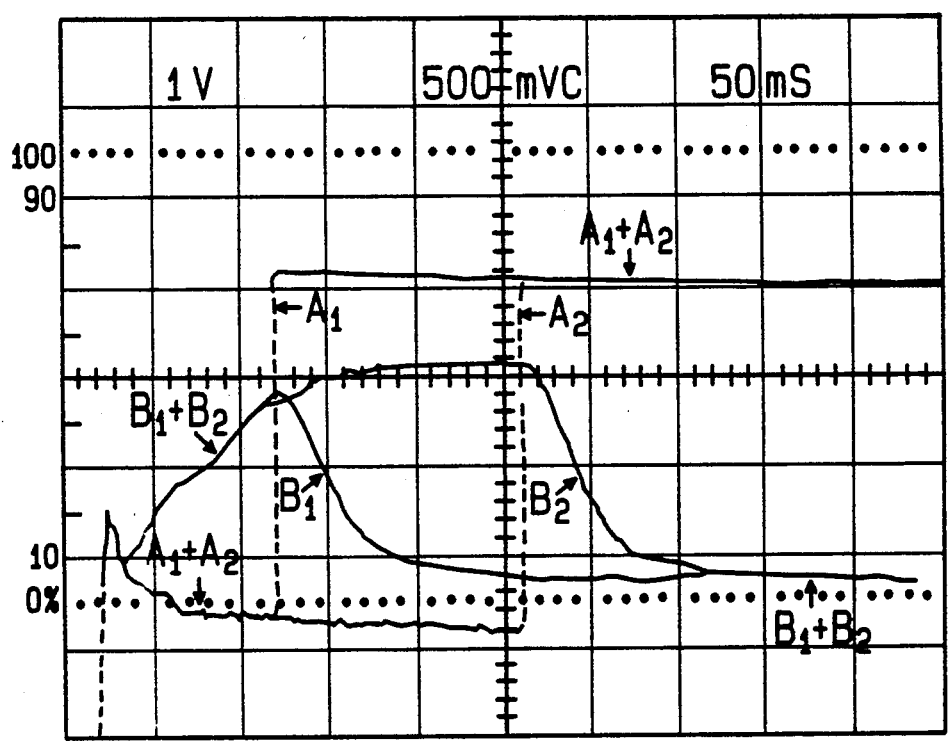
FIG. 3b are oscilloscope displays showing response time for Ne gas plasmas of two different durations, $\sim 120$ and $\sim 260$ ms.

Plasma pulses of longer duration have a more complicated time evolution. Again there is a rapid rise, $\sim 1$ ms in plasma current to target 10. This is followed by the same $\sim 10$-ms decay to a valley roughly equal to $\frac{1}{4}$ the peak value. This is followed by a rise in plasma current in 30 ms to a plateau that is about twice the amplitude of the valley. Measuring from the time of breakdown of the gas, the formation of the plasma takes about 50 ms to stabilize at the plateau level. When the plasma is terminated, the current drops to zero in about 1 ms. From that instant, the output signal falls to 1/e of its peak in 50 ms, as shown in FIG. 3b, for plasma pulses of two different durations.

As depicted in the preferred embodiment, then, this invention enables measurement of momentum flux from an intense plasma stream onto surfaces defining the plasma boundary. It is particularly useful when the plasma stream is accompanied by high heat fluxes, in an intense magnetic field, and in a pulsed plasma environment.

In other embodiments, the apparatus of the present invention may be applied as well to determine other forces in equally inhospitable environments, for example, the force of intense pulsed laser beams on material surfaces, or the force due to chemical reactions on a surface. The apparatus of the present invention may be used to measure static, slowly varying, and/or pulsed forces.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. An apparatus for measuring momentum flux from an intense plasma stream, comprising:
   refractory target means oriented normal to the flow of said plasma stream for bombardment by said plasma stream where said bombardment by said plasma stream applies a pressure to said target means,
   pendulum means for communicating a translational displacement of said target to a force transducer where said translational displacement of said target is transferred to said force transducer by an elongated member coupled to said target, where said member is suspended by a pendulum configuration means and where said force transducer is responsive to said translational displacement of said member, and
   force transducer means for outputting a signal representing pressure data corresponding to said displacement.

2. The apparatus of claim 1 wherein said refractory target means is comprised of electrically non-conducting materials.

3. The apparatus of claim 2 wherein said refractory target means is comprised of one or more carbon disks.

4. The apparatus of claim 2 wherein said force transducer means is isolated from said plasma stream.

5. The apparatus of claim 4 wherein said pendulum means is comprised of electrically non-conducting materials.

6. The apparatus of claim 5 wherein said member is a quartz tube.

7. The apparatus of claim 5 wherein said pendulum configuration means includes suspension means which allows only longitudinal, axial displacement of said member.

8. The apparatus of claim 7 wherein said suspension means is comprised of a plurality of pairs of wires wherein each wire is at 45 degrees with respect to vertical, and each pair of said wires is coplanar and perpendicular to the axis of said member.

9. The apparatus of claim 8 including shielding means for protecting said pairs of wires from plasma bombardment.

10. The apparatus of claim 9 including means for electrically biasing said target means.

11. The apparatus of claim 9 including means for monitoring the temperature of said target means.

12. The apparatus of claim 11 including adjusting means for positioning and calibrating said pendulum means.

13. The apparatus of claim 12 wherein said adjusting means is adjustable bellows.

14. The apparatus of claim 13 including damping means for reducing bouncing of said pendulum means when an impulsive load is applied.

15. The apparatus of claim 14 wherein said force transducer means is a capacitance manometer.

16. The apparatus of claim 14 wherein said force transducer means is piezoelectric.

17. The apparatus of claim 14 wherein said force transducer means is a strain gauge.

18. The apparatus of claim 14 wherein said force transducer means is a torsion pendulum.

19. The apparatus of claim 8 wherein the length of said wires of said suspension means is controlled by a wire adjusting means.

* * * * *